United States Patent [19]

Wozniak et al.

[11] Patent Number: 5,549,728

[45] Date of Patent: Aug. 27, 1996

[54] UREA-CONTAINING FERTILIZER WITH REDUCED RATE OF AMMONIA RELEASE

[75] Inventors: Elizabeth M. Wozniak, Sandy; Stephen G. Baughman, Salt Lake City, both of Utah

[73] Assignee: Cytozyme Laboratories, Inc., Salt Lake City, Utah

[21] Appl. No.: 238,217

[22] Filed: May 4, 1994

[51] Int. Cl.⁶ .............................. C05F 11/08; C05C 9/00
[52] U.S. Cl. .................... 71/6; 71/28; 71/64.07; 71/64.11; 71/902
[58] Field of Search ................. 71/6, 7, 28–30, 71/902, 64.07, 64.11

[56] References Cited

U.S. PATENT DOCUMENTS

| | | | |
|---|---|---|---|
| 3,523,018 | 8/1970 | Geissler et al. | 71/28 |
| 3,565,599 | 2/1971 | Sor et al. | 71/28 |
| 4,311,511 | 1/1982 | Graefe et al. | 71/9 |
| 4,337,077 | 6/1982 | Rutherford | 71/9 |
| 4,551,164 | 11/1985 | Tenzer | 71/6 |
| 4,647,537 | 3/1987 | Shigemitsu | 435/178 |
| 4,666,497 | 5/1987 | Tenzer | 71/6 |
| 4,670,037 | 6/1987 | Kistner, Sr. | 71/1 |
| 4,932,992 | 6/1990 | Radel | 71/902 |

FOREIGN PATENT DOCUMENTS 0223661  5/1987  European Pat. Off. .

*Primary Examiner*—Ferris Lander
*Attorney, Agent, or Firm*—Trask, Britt & Rossa

[57] ABSTRACT

A plant growth-enhancing composition comprising a microbial fermentation lysate is described. Also described is an enhanced urea fertilizer comprising the microbial lysate combined with urea or a urea-containing fertilizer. The combination provides a reduced rate of ammonia release by inhibiting urease activity.

8 Claims, 1 Drawing Sheet

KINETICS OF THE HYDROLYSIS OF
ACTIVATED (---) VS CONVENTIONAL (——) UREA.

KINETICS OF THE HYDROLYSIS OF
ACTIVATED (---) VS CONVENTIONAL (——) UREA.

UREA-CONTAINING FERTILIZER WITH REDUCED RATE OF AMMONIA RELEASE

BACKGROUND

1. Field of the Invention

This invention relates generally to plant fertilizers, and more specifically to means for enhancing the uptake of certain fertilizer components.

2. State of the Art

Nitrogen is one of the primary nutrients required by plants for robust growth. Most fertilizer compositions include nitrogen, most commonly in the form of urea. Urea applied to soil is enzymatically hydrolyzed to ammonia by an enzyme known as urease, which is found in soil microorganisms. However, this conversion is very rapid and exceeds the rate at which plants can utilize the released ammonia. The excess ammonia is either further converted to nitrites and nitrates by nitrifying bacteria in the soil (including Nitrosomonas and Nitrobacter species), which leaches into the water, or is lost to the atmosphere by denitrification, as known in the art. However, only about 40% to 50% of urea applied in conventional fertilizers appears to be utilized by plants, while the remainder is lost by the above-described processes. Obviously, a considerable amount of applied urea is wasted in that it is not utilized by plants.

Furthermore, the use of urea as the nitrogen source in fertilizers has serious environmental consequences. Nitrites and nitrates produced from ammonia by the nitrifying bacteria are not absorbed by the soil and leach into ground water and drinking supplies. Excess consumption of nitrites and/or nitrates causes a condition known as methemoglobinemia or "blue sickness", which is frequently fatal to infants less than 21 days old. Excess urea is often applied to crops to compensate for the inefficiency of urea uptake described previously. Much of the excess urea goes to run-off from the agricultural fields, resulting in acceleration of the eutrophication processes of surface water.

Despite these problems, urea remains one of the most inexpensive and widely available nitrogen sources for fertilizers. Therefore, attempts have been made to provide urea-containing fertilizers with reduced rates of nitrogen release to the environment.

One approach to the problem is to coat a urea-containing fertilizer pellet with a slow-release coating such as polyacrylamide or the like (e.g. European Patent No. 356,755 by Sommer et al, publ. Mar. 7, 1990). Polyacrylamide and similar coatings slow the rate of release of the urea into the surrounding soil. Another approach is to prepare a urea-formaldehyde conjugate composition. However, both of these approaches are relatively expensive, and thus the products are not practical for use by low-income farmers in Third World countries and elsewhere.

Another approach is to combine a urea-containing fertilizer with a urease inhibitor. The known inhibitors of urease in soil micro-organisms include diaminophosphinyl compounds and derivatives, various thio- and thio-phosphoryl compounds such as thiopyridine, thiopyrimidine and related compounds, and copper sulfate (see for example U.S. Pat. Nos. 4,932,991 issued Jun. 12, 1990 to Crenshaw and Radel; U.S. Pat. No. 4,824,783 issued Apr. 25, 1989 to Hendrickson et al; U.S. Pat. No. 4,670,038 issued Jun. 2, 1987 to Medina et al.; U.S. Pat. No. 3,523,018 issued Aug. 4, 1970 to Geissler et al, respectively). Many of the above compounds are also relatively expensive.

Accordingly, a need remains for an inexpensive, urea-containing fertilizer which has a reduced rate of conversion of urea to nitrites and nitrates. A need further remains for an effective urease-inhibiting composition having urease-inhibiting activity which can effectively reduce the amount of urea required to achieve a given yield of plant mass.

SUMMARY OF THE INVENTION

The invention comprises a microbial fermentation lysate product with urease-inhibiting and plant growth-enhancing properties. The invention further comprises a fertilizer composition containing urea and the microbial lysate, which has a reduced rate of conversion of urea to ammonium, and which is effective to stimulate plant growth at urea levels lower than those required when urea is used alone. A preferred embodiment of the invention includes a urease-inhibitive composition comprising copper, a microbial lysate, and other micronutrients and metals, and a method for using the composition. Additionally, the invention encompasses a method of slowing the release of urea from a urea-containing fertilizer.

The microbial lysate is produced by fermenting certain bacteria to a plateau phase of growth. The lysate, in combination with certain minerals and micronutrient elements, reduces the rate of hydrolytic conversion of urea to ammonia. The microbial lysate composition has also been found in laboratory tests to inhibit the enzyme urease in soil microorganisms. In any case, the rate of ammonia release from urea combined with the microbial lysate composition is closer to the rate of plant urea utilization than is the rate for urea alone. Therefore, there is a corresponding reduction in the amount of ammonia available for conversion to the undesirable nitrites and nitrates. Additionally, since a higher proportion of the urea goes to support plant growth, smaller amounts can be applied to the agricultural fields for an equivalent increase in production. Both the cost and the amount of urea which goes to run-off are thereby substantially reduced.

In the presently preferred embodiment, urea granules are coated with the urease-inhibitive composition. Use of the coated urea granules reduces by about 15% to 25% the amount of urea required to achieve a given plant mass yield. Other means of combining the urease-inhibitive composition with urea, or of separately but concurrently using a urea fertilizer and the urease-inhibitive composition, are also feasible methods of realizing the benefits of the invention.

DETAILED DESCRIPTION OF THE INVENTION

Figure 1:
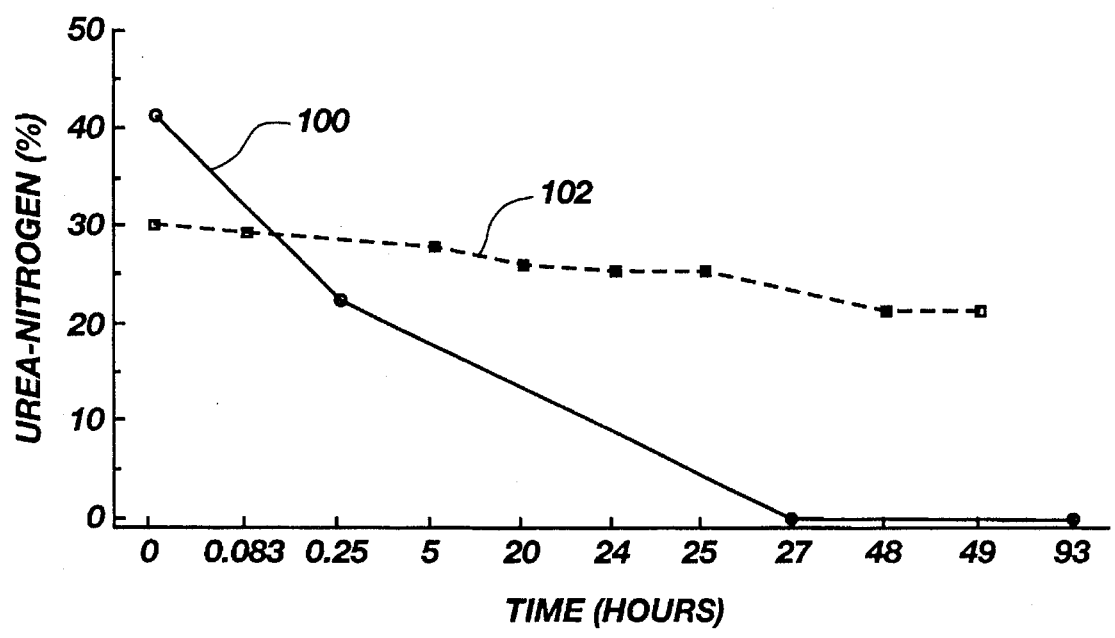
FIG. 1 is a chart of the rate of urea hydrolysis in the presence and absence of a microbial fermentation product of the invention.

An improved urea-based fertilizer is prepared by combining a microbial lysate having a pH at about pH 3, and containing an effective amount of a copper ion, with urea or a urea-containing fertilizer. In a preferred embodiment, the urease-inhibiting composition is sprayed onto urea granules to coat the exterior of same.

A preferred microbial lysate is prepared from a plateau phase culture of *Lactobacillus acidophilus* and/or *L. bulgaricus*. In a further preferred embodiment, the plateau phase culture is a co-culture of the Lactobacillus with *Aspergillus niger*.

In one embodiment, the urea-containing fertilizer is urea mixed with a mineral such as bentonite, talc, vermiculite, or the like, to improve the physical characteristics such as spreadability, solubility, etc., of the mixture.

For purposes of the invention, plateau phase culture is defined as a culture in which the increase in cell number per unit time has changed from a first exponential function to a much slower growth rate or a steady state, and which has a pH of 4 or less. The growth medium may be a milk-water mixture and preferably contains kelp derived from both dry kelp and liquid kelp forms. The plateau phase culture is terminated by addition of a preservative, for example, calcium propionate or sodium benzoate, in an amount effective to kill the cells in the culture.

In a preferred embodiment, minerals are added to the microbial lysate after termination of the culture. These minerals must include an effective amount of a copper salt, for example, copper sulfate in concentration of between about 0.5% and 3.0% by weight. Optionally, other minerals may be added as follows: sulfur ion to between about 2.0% and 4.0% by weight, manganese to between about 0.1% and 0.8%, ferrous iron concentration to between about 0.5%–2.0%, and zinc to between about 1.0% and 5.0% by weight. Variations of up to 0.5% in the concentrations of individual metals are considered not to alter the activity of the product. The lysate may further contain trace amounts of vitamins including biotin, lactoflavin, folic acid, pantothenic acid, and inositol; and alcohol-ethoxylates and polysiloxane (WEX, X-77, and T-80) totalling between about 8% and 10% by weight. The final product should have a pH between about 1.5–3.5.

The microbial lysate is produced by culturing Lactobacillus in a milk-based medium until the plateau phase is reached. Optionally but desirably, one or more of the following is added to the culture medium as the growth approaches the plateau phase (at about 60% to 80% of the plateau phase cell concentration): kelp or a kelp extract; sugar as L-dextrose or L-sucrose; micronutrients and vitamins including citric acid, salicylic acid, ascorbic acid, folic acid, inositol, thiamine, para-aminobenzoic acid, and niacin are added to the culture medium as the growth of the culture approaches the plateau phase. Further desirably, an inoculum of *Aspergillus niger* is added along with the kelp and sugar ingredients.

After reaching the plateau phase, the culture is harvested by addition of an effective amount of one or more suitable preservatives. In the working embodiment, these preservatives are calcium propionate and/or sodium benzoate in amounts of between about 0.1 and 0.5% by weight. The microbial lysate is then further processed by homogenization and addition of alcohol poly-ethoxylates and polysiloxane.

The microbial lysate produced by the above processes is an aqueous suspension of protein and protein hydrolysate with a pH of about pH 2±0.5 and density about 1.30 g/ml. The aqueous process and formulation solvent is about 60% by weight. Nitrogen based organics are present to about 5% by weight, other organics to about 20%, and inorganic compounds are about 15%. Thiamine, paraaminobenzoic acid, and niacin are present in amounts by weight of about 0.1%, 0.1%, and 0.3%, respectively. The other organics include ascorbic acid, about 0.1%; citric acid, about 1%; salicylic acid, about 1%; Wex, about 2%; X-77, about 6%; and T-80, about 1%.

Additionally, hydrogen peroxide produced by the growth activity of the culture may be present. The microbial lysate may also contain compounds whose synthesis requires or is facilitated by the presence of hydrogen peroxide, such as hydroquinones and simple derivatives of hydroquinones.

A composition comprising the aqueous microbial lysate plus copper sulfate at a concentration of between about 0.5% and about 3% by weight, and optionally, other metal ions, is sprayed onto urea-containing fertilizer granules by any of the methods known for that purpose. Such methods are well known to those in the art. Optionally but desirably, the urea or urea-containing fertilizer is mixed with a powder diluent such as talc, bentonite, etc, to improve the spreadability and other physical and chemical qualities.

A fertilizer which has been coated with the microbial lysate according to this embodiment may comprise about 73% urea, 8% lysate plus copper ion, and 19% bentonite. Deviations of 5% or more from the stated individual proportions of these three components do not significantly alter the effectiveness of the composition in inhibiting urease, or in promoting plant growth.

The inhibition of hydrolysis of urea by this composition is illustrated in Experiment 1, the results of which are shown in FIG. 1.

EXPERIMENT 1

In parallel flasks, either A) 497.7 mg activated urea comprising 72.9% urea, 7.7% microbial lysate, and 19.4% bentonite, or B) 500.5 mg of urea alone, was dissolved in 100 milliliters of distilled water and 500 mg of urease was added to each sample. After thorough mixing, the flasks were placed at room temperature and 10 milliliter samples were removed at incubation times ranging from 5 minutes to 93 hours. At about 25 hours, the percentage of nitrogen present as urea was 25% in sample A (activated urea), as compared to 0.1% in sample B.

In FIG. 1, curve 100 is the rate of hydrolysis of urea alone (B), while curve 102 is the rate of hydrolysis of the urea combined with the microbial lysate. A more detailed analysis based on the data shown in FIG. 1 demonstrates that the activated urea had a half-life of about 104 hours, as compared to less than 30 minutes for conventional urea.

EXPERIMENT 2

In a field test of rice yields, replicate plots were treated with urea alone or in combination with the liquid lysate described herein prior to planting with rice of variety IR-64. The amounts of urea applied were varied between 100 and 250 kilograms (kg) per hectare (ha), while the amount of liquid product was varied from 0 to 500 ml/ha. The yield of unhusked rice for each plot was determined and the results are shown in Table I.

The field test results of Table I show that when using urea in combination with the liquid composition described hereinabove, the amount of urea applied to a field can be reduced by at least about 20% compared to conventional urea without a noticeable reduction in plant growth and/or crop yield.

TABLE I

Yield of unhusked rice grain variety IR-64

| Treatment | | Sites | |
|---|---|---|---|
| | | 1 | 2 |
| | | Yield, Quintals/hectare) | |
| $N_1$ | $S_0$ | 36.7$^{ab}$ | 61.2$^a$ |
| | $S_1$ | 34.2$^a$ | 61.7$^{ab}$ |
| | $S_2$ | 39.9$^{bc}$ | 64.9$^{ab}$ |
| | $S_3$ | 42.7$^{cde}$ | 65.1$^{ab}$ |
| | $S_4$ | 42.8$^{cde}$ | 64.7$^{ab}$ |
| $N_2$ | $S_0$ | 45.1$^{cde}$ | 61.1$^a$ |
| | $S_1$ | 50.5$^{cde}$ | 57.4$^{ab}$ |
| | $S_2$ | 50.8$^{cde}$ | 62.8$^{ab}$ |
| | $S_3$ | 48.6$^{cde}$ | 64.0$^{ab}$ |
| | $S_4$ | 48.4$^{cde}$ | 63.7$^{ab}$ |
| $N_3$ | $S_0$ | 45.9$^{cde}$ | 61.3$^a$ |
| | $S_1$ | 52.3$^{cde}$ | 62.0$^{ab}$ |
| | $S_2$ | 57.5$^{cde}$ | 65.5$^{ab}$ |
| | $S_3$ | 48.5$^{cde}$ | 67.7$^b$ |
| | $S_4$ | 50.5$^{cde}$ | 66.1$^{ab}$ |
| $N_4$ | $S_0$ | 49.7$^{cde}$ | 62.0$^{ab}$ |
| | $S_1$ | 46.4$^{cde}$ | 67.7$^{ab}$ |
| | $S_2$ | 52.9$^{cde}$ | 64.7$^{ab}$ |
| | $S_3$ | 54.3$^{cde}$ | 64.4$^{ab}$ |
| | $S_4$ | 51.6$^{cde}$ | 66.6$^{ab}$ |

$N_1$; $N_2$; $N_3$; $N_4$ = 100; 150; 200; 250 kg urea/ha.
$S_0$; $S_1$; $S_2$; $S_3$; $S_4$ = 0; 125; 250; 375; 500 ml/ha of liquid product.

EXPERIMENT 3

A third experiment demonstrates the utility of the fertilizer composition in promoting growth of *Zea mays* variety 912, a field corn. 10 seeds per 6" pot were planted at a depth of 1" in a media comprising 90% coarse silica sand and 10% Fison's brand Sunshine mix #3, a commercially available seedling mix. The pots were incubated in a growth chamber providing environmental conditions corresponding to Miami, Fla. on June 1. These were: average temperature, 79.5° F.; average high temperature, 86.5° F.; average low temperature, 71.5° F.; with relative humidity ranging from 55% to 85%; sunrise, 6:30 AM and sunset, 8:10 PM. At 31 days after planting, the corn plants were harvested and the dry weights measured.

The dry weight was compared in plants grown with the invented activated urea or with similar amounts of conventional urea fertilizer, the two treatments applied on the same schedule. When the test fertilizer was applied to the soil 13 days after planting in an amount corresponding to 1 liter/hectare and 168 kg nitrogen per hectare, the dry weight of plants grown with the invented activated urea was 16% greater than that of plants grown with conventional urea. The dry weight of roots alone was increased 23% by the activated urea. The results show that the activated urea produced faster seedling and plant growth. When the same total amount of activated urea was split into two equal doses, and one applied prior to planting, the other 13 days post-planting, the growth of the activated urea treated plants was increased by 3–7% over that of plants given conventional urea.

It will be recognized that various modifications and substitutions may be made in the composition and method without departing from the concept and spirit of the invention.

What is claimed is:

1. A plant growth-enhancing composition comprising a combination of a fertilizer containing urea and a microbial lysate prepared by fermentation of a culture of a bacterium selected from the group consisting of *Lactobacillus acidophilus* and *Lactobacillus bulgaricus* to produce a plateau phase culture in which the increase in cell number per unit time has changed from a first exponential function to a substantially slower growth rate and has a pH of less than about 4, wherein said combination is characterized by a reduced rate of release of ammonium from the urea.

2. The composition of claim 1, wherein said culture further includes micro-organisms of the species *Aspergillus niger*.

3. The composition of claim 2, further including between about 0.5% and 30% by weight, of copper sulfate.

4. The composition of claim 3, having a pH of between about 1.5 and 3.5.

5. The fertilizer composition of claim 1, wherein said microbial lysate is present in an amount of from 5% to 15% by weight.

6. The fertilizer composition of claim 1, further including an effective amount of a mineral carrier selected from the group consisting of: bentonite, vermiculite, and talc.

7. The fertilizer composition of claim 6, wherein said urea is present in an amount of from 60% to 99.5% by weight.

8. The fertilizer composition of claim 1, further including an organic compound selected from the group consisting of one or more of the following: ascorbic acid in an amount of about 0.1% by weight, citric acid in an amount of about 1% by weight, and salicylic acid in an amount of about 1% by weight.

* * * * *

UNITED STATES PATENT AND TRADEMARK OFFICE
CERTIFICATE OF CORRECTION

PATENT NO. : 5,549,728
DATED : Aug. 27, 1996
INVENTOR(S) : Wozniak et al.

It is certified that error appears in the above-identified patent and that said Letters Patent is hereby corrected as shown below:

Col. 5, Table I, line 19, change "$67.7^b$" to --$67.6^b$--

Col. 5, Table I, line 22, change "$67.7^{ab}$" to --$67.7^b$--

Col. 6, line 30, change "30%" to --3.0%--.

Signed and Sealed this

Fourteenth Day of April, 1998

Attest:

BRUCE LEHMAN

Attesting Officer         Commissioner of Patents and Trademarks